US008976870B1

(12) United States Patent
Cismas (10) Patent No.: US 8,976,870 B1
(45) Date of Patent: Mar. 10, 2015

(54) BLOCK AND MODE REORDERING TO FACILITATE PARALLEL INTRA PREDICTION AND MOTION VECTOR PREDICTION

(75) Inventor: Sorin C. Cismas, Saratoga, CA (US)

(73) Assignee: Geo Semiconductor Inc., Santa Clara, CA (US)

(*) Notice: Subject to any disclaimer, the term of this patent is extended or adjusted under 35 U.S.C. 154(b) by 1969 days.

(21) Appl. No.: 11/512,684

(22) Filed: Aug. 30, 2006

(51) Int. Cl.
 *H04N 7/12* (2006.01)
 *H04N 19/593* (2014.01)
 *H04N 19/11* (2014.01)

(52) U.S. Cl.
 CPC .... *H04N 19/00763* (2013.01); *H04N 19/00042* (2013.01)
 USPC .................................................. 375/240.24

(58) Field of Classification Search
 CPC ............... H04N 19/00763; H04N 19/00042
 USPC .............. 375/130–153, 240.01–240.29
 IPC ................ H04B 1/66, 1/00; H04N 7/12, 11/02, H04N 11/04; G10L 19/00, 21/04
 See application file for complete search history.

(56) References Cited

U.S. PATENT DOCUMENTS

| 2004/0213348 | A1* | 10/2004 | Kim et al. ............... 375/240.12 |
| 2005/0219069 | A1* | 10/2005 | Sato et al. ............... 341/50 |
| 2006/0222066 | A1* | 10/2006 | Yoo et al. ............... 375/240.03 |
| 2007/0188505 | A1* | 8/2007 | Bivolarski et al. ............... 345/505 |

FOREIGN PATENT DOCUMENTS

JP    2004-140473    *  5/2004  ............... H04N 7/26

OTHER PUBLICATIONS

Richardson, Ian E. G., "H.264 and MPEG-4 Video Compression: Video Coding for Next-generation Multimedia", 2003, pp. 159, 169-184.*
Pan, Lin, Rahardja et al., "Fast Mode Decision Algorithm for INtraprediction in H.264/AVC Video Coding", 2005 IEEE Transactions on Circuits and Systems for Video Technology, vol. 15, No. 7, Jul. 2005, pp. 813-822.*
"Advanced Video Coding for Generic Audiovisual Services", Recommendation H.264(E) by International Telecommunication Union-Telecommunication Standardization Sector, Geneva, Switzerland, Feb. 2005, Sections 8.3 and 8.4.

* cited by examiner

*Primary Examiner* — Richard Torrente
(74) *Attorney, Agent, or Firm* — Sughrue Mion, PLLC (57) ABSTRACT

A method for processing a plurality of sub-blocks in a block of video is disclosed. The method generally includes the steps of (A) intra predicting a first group of the sub-blocks in a first quadrant of the block, (B) intra predicting a second group of the sub-blocks in a second quadrant of the block after starting the intra predicting of the first group and (C) intra predicting a third group of the sub-blocks in the first quadrant after starting the intra predicting of the second group, wherein the first group and the third group together account for all of the sub-blocks in the first quadrant.

19 Claims, 8 Drawing Sheets

| CONTEXT | INTRA 4X4 PREDICTION MODE | | | | | | | | |
|---|---|---|---|---|---|---|---|---|---|
| | 0 | 1 | 2 | 3 | 4 | 5 | 6 | 7 | 8 |
| LEFT | | X | X | | X | X | X | | X |
| ABOVE-LEFT | | | | | X | X | X | | |
| ABOVE | X | | X | X | X | X | X | X | |
| ABOVE-RIGHT | | | | X | | | | X | |

FIG. 4

| DEPENDENCIES | INTRA 4X4 BLOCKS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| LEFT | | 6 | | 6 | | 6 | | 6 | | 6 | | 6 | | 6 | | 6 |
| ABOVE-LEFT | | | | | | | | | | | | | | | | |
| ABOVE | | | | | | | | | | | | | | | | |
| ABOVE-RIGHT | | | 2 | | | 2 | | | | 2 | | | | 2 | | |

| 0 | 1 | 3 | 5 |
|---|---|---|---|
| 2 | 4 | 6 | 8 |
| 7 | 9 | 11 | 13 |
| 10 | 12 | 14 | 15 |

FIG. 6

| DEPENDENCIES | INTRA 4X4 BLOCKS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| LEFT | | 6 | | | | | | | | | | | | | | 6 |
| ABOVE-LEFT | | | | | | | | | | | | | | | | |
| ABOVE | | | | | | | | | | | | | | | | |
| ABOVE-RIGHT | | | 2 | | | | 2 | | | | 2 | | | | 2 | |

FIG. 9a  0, 1, 2, 3, 4, 5, 6, 7, 8   ALL SETTLED

FIG. 9b  0, 7, 3, 1, 8, 2, 6, 4, 5   LEFT UNSETTLED

FIG. 9c  1, 8, 0, 2, 6, 4, 5, 7, 3   ABOVE-RIGHT UNSETTLED

FIG. 9d  1, 8, 0, 2, 6, 4, 5, 7, 3   ABOVE UNSETTLED

FIG. 9e  3, 2, 1, 0   ALL SETTLED

FIG. 9f  0, 1, 2, 3   LEFT UNSETTLED

FIG. 9g  1, 0, 2, 3   ABOVE UNSETTLED

190

| 0 | 1 | 3 | 5 |
|---|---|---|---|
| 2 | 4 | 6 | 7 |

| 0 | 1 |
|---|---|
| 2 | 3 |
| 4 | 5 |
| 6 | 7 |

| 0 | 1 | 3 | 5 |
|---|---|---|---|
| 2 | 4 |   |   |
| 6 | 7 | 9 | 11 |
| 8 | 10 | 12 | 13 |

| 0 | 1 | 3 |
|---|---|---|
| 2 | 4 | 5 |
| 6 | 7 | 8 |

FIG. 14

BLOCK AND MODE REORDERING TO FACILITATE PARALLEL INTRA PREDICTION AND MOTION VECTOR PREDICTION

FIELD OF THE INVENTION

The present invention relates to video processing generally and, more particularly, to a method and/or architecture for block and mode reordering that may be suitable for H.264.

BACKGROUND OF THE INVENTION

A latest video compression technique, commonly referred to as an H.264/Advanced Video Coding recommendation (International Telecommunication Union-Telecommunication Standardization Sector, Geneva, Switzerland) and/or an MPEG-4 Part 10 recommendation (document ISO/IEC 14496-10 International Organization for Standardization/International Electrotechnical Commission, Geneva, Switzerland) has a better coding efficiency for intra predictions compared with previous video coding standards. The intra prediction coding efficiency is achieved by an extensive use of spatial context to derive a prediction. Intra-coded macroblocks are predicted either as 16×16 sample blocks, 8×8 sample blocks or 4×4 sample blocks. The 4×4 sample prediction mode is better suited for areas that have many spatial details.

Figure 1:
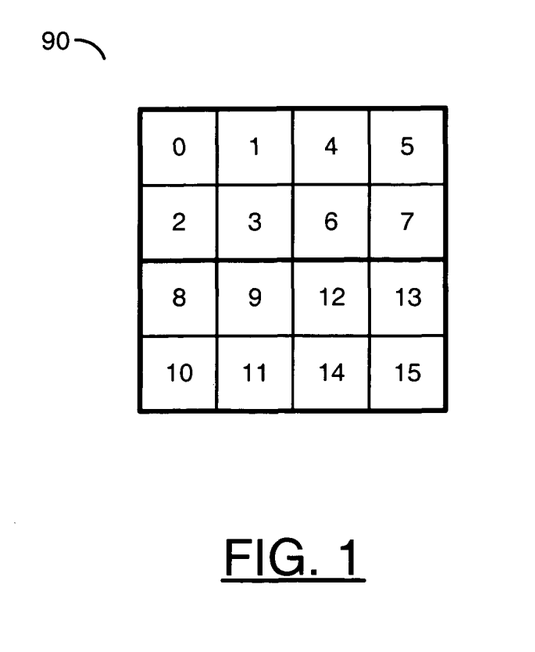
FIG. 1 is a diagram of an H.264/AVC intra 4×4 luminance order sequence.

Referring to FIG. 1, a diagram of an H.264/AVC intra 4×4 luminance order sequence 90 is shown. A luminance component of a macroblock is partitioned in four 8×8 sample blocks and each of the 8×8 sample blocks is further partitioned in four 4×4 sample blocks. The 4×4 sample blocks are coded using the order 90 from a position 0 to a position 15 sequentially. A prediction of each 4×4 sample block is based on the samples in the spatial neighbors. The dependencies between spatial neighbors impose a limit of how far the intra 4×4 encoding and decoding can be parallelized.

SUMMARY OF THE INVENTION

The present invention concerns a method for processing a plurality of sub-blocks in a block of video. The method generally comprises the steps of (A) intra predicting a first group of the sub-blocks in a first quadrant of the block, (B) intra predicting a second group of the sub-blocks in a second quadrant of the block after starting the intra predicting of the first group and (C) intra predicting a third group of the sub-blocks in the first quadrant after starting the intra predicting of the second group, wherein the first group and the third group together account for all of the sub-blocks in the first quadrant.

The objects, features and advantages of the present invention include providing a method and/or architecture for block and mode reordering that may (i) be suitable for H.264, (ii) reorder block order processing, (iii) reorder intra prediction mode directions, (iv) increase a throughput of parallel intra-block predictions and/or (v) increase a throughput of parallel motion vector predictions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention discloses a new processing order for 4×4 sample blocks different from the H.264/AVC order that may minimize dependencies for intra predictions and/or predicted motion vectors. The new processing order generally allows a more efficient implementation compared with conventional techniques. Furthermore, intra 4×4 prediction modes may be prioritized in support of parallel operations.

Figure 2:
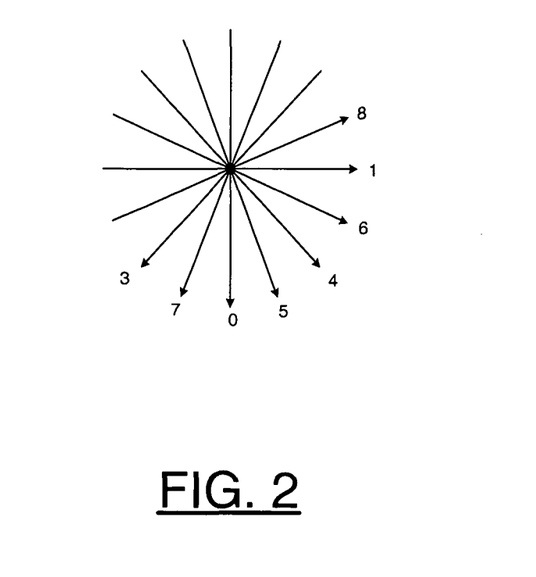
FIG. 2 is a diagram of intra prediction mode directions.

Referring to FIG. 2, a diagram of intra prediction mode directions is shown. Depending on an availability of neighboring partitions, each 4×4 block (or sub-block) and/or 8×8 block (or sub-block) within a 16×16 macroblock may be predicted in up to 9 different directions. A prediction mode 2 (not shown in FIG. 2) is a DC prediction mode that is non-directional, but may depend on the samples above and the samples to the left of a current block. The predictions modes may be referred to as a vertical mode (e.g., mode 0), a horizontal mode (e.g., mode 1), a DC mode (e.g., mode 2), a diagonal down left mode (e.g., mode 3), a diagonal down right mode (e.g., mode 4), a vertical right mode (e.g., mode 5), a horizontal down mode (e.g., mode 6), a vertical left mode (e.g., mode 7) and a horizontal up mode (e.g., mode 8). Each 16×16 block may be predicted in up to 4 different directions (e.g., the vertical mode 0, the horizontal mode 1, the DC mode 2 and a plane mode 3).

Figure 3:
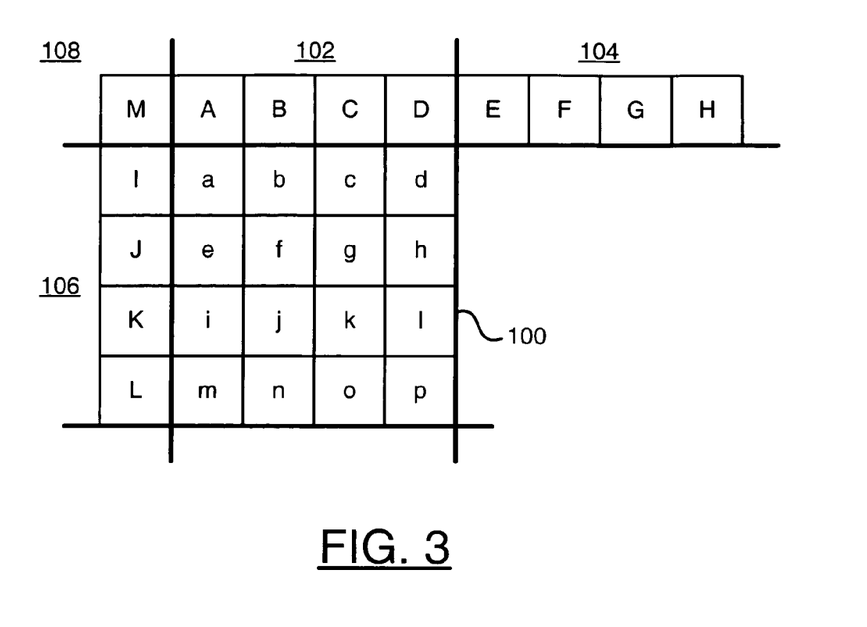
FIG. 3 is a block diagram of a block with surrounding context.

Referring to FIG. 3, a block diagram of a block 100 with surrounding context is shown. The block 100 may be referred to as a current block (or sub-block). The current block 100 may represent any one of the block positions (or indices) 0-15 at a time as shown in FIG. 1. The current block 100 generally comprises 16 luminance samples (e.g., a-p) arranged in a 4×4 matrix. The surrounding context generally comprises a block 102, a block 104, a block 106 and a block 108. A bottom row of samples (e.g., A-D) in the block 102 directly above the current block 100 generally provide a portion of the upper context. A bottom row of samples (e.g., E-H) in the block 104 above and to the right (above-right) of the current block 100 generally provide a second portion of the upper context. The samples (e.g., I-L) in a right column of the block 106 may provide a left context. A lower-right corner sample (e.g., M) of the block 108 may provide an above and to the left (above-left) context for the current block 100. Rules for intra predicting samples (both luminance and chrominance) are generally disclosed in section 8.3 and the associated subsections of the ITU-T H.264 (E) recommendation ISO/IEC 14496-10 (E) recommendation, which are hereby incorporated by reference in its entirety.

Figure 4:
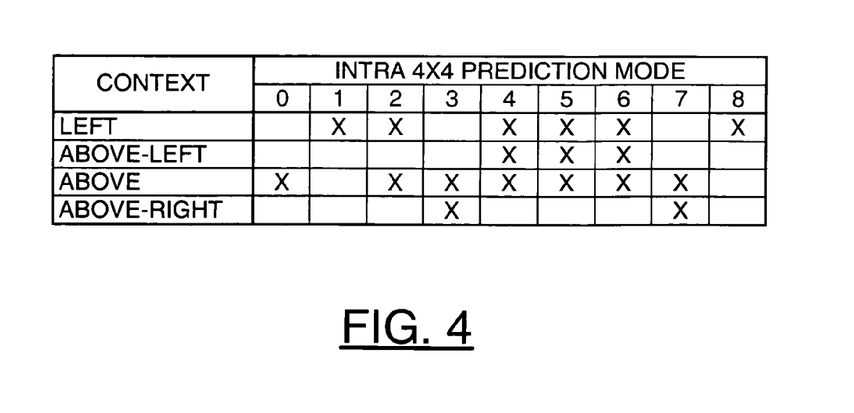
FIG. 4 is a table for intra 4×4 prediction dependencies on a spatial context.

Referring to FIG. 4, a table for intra 4×4 prediction dependencies on a spatial context is shown. An intra prediction for each of the block positions/indices shown in FIG. 1 (e.g., numbers 0-15) is generally dependent on the availability of the surrounding context shown in FIG. 3. For block position 3, 7, 11, 13 and 15, the prediction modes 3 and 7 do not use the above-right context in the block 104. Except for the DC prediction mode 2, each of the other prediction modes may be applied only when the appropriate context is available. Exceptions generally exist at (i) picture boundaries where the context is generally considered not available and (ii) slice boundaries where the context may or may not be available depending on a flag (e.g., constrained_intra_pred_flag) that may change for every picture. Hence, all 9 prediction modes shown in FIG. 2 may be used most of the time to find a best match between the predicted block and the original block being encoded.

Each "X" in the table generally indicates that a dependency exists between the intra prediction mode and a corresponding context (e.g., blocks 102-108). Consider the mode 4 column as an example. An intra prediction for the current block 100 may use the context from the left block 106, the above-left block 108 and the above block 102. If any one or more of the context samples in the blocks 102, 106 and/or 108 are unavailable, the mode 4 intra prediction may not be performed. As such, the prediction mode 4 is dependent on the left context, the above-left context and the above context. Blank boxes in the table generally indicate that no dependency may exist between the prediction mode and the corresponding context. For example, no dependency exists between the mode 4 direction and the above-right context block 104. As such, the mode 4 intra prediction may be performed regardless of the availability/non-availability of the samples E-H in the above-right block 104.

Figure 5:
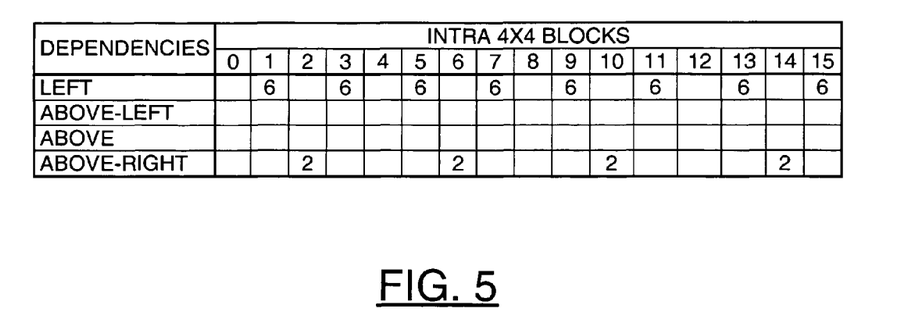
FIG. 5 is a table for intra 4×4 prediction mode dependencies.

Referring to FIG. 5, a table for intra 4×4 prediction mode dependencies is shown. When the 4×4 blocks are processed in the coding order 90 (e.g., position 0 through position 15 as shown in FIG. 1), the processing may advance to a next 4×4 block only after a previous 4×4 block has been processed. Each number in the table cells in FIG. 5 generally indicates the number of prediction modes that may wait for a previous 4×4 block to be completed, where the previous block is to the left, above-left, above or above-right.

The odd-numbered blocks (e.g., block positions 1, 3, 5, 7, 9, 11, 13 and 15) may have to wait for the previous block to be fully processed in 6 out of the 9 prediction modes. For some of the block numbers (e.g., block positions 2, 6, 10, and 14), 2 out of the 9 prediction modes may have to wait for the previous block to be fully processed. For example, the block 9 may have to wait for the left context (e.g., block 8) to be available in order to predict using the six prediction modes 8, 1, 6, 4, 5 and 2. No dependencies are shown for block 9 regarding the above-left context (e.g., block 2), above context (e.g., block 3) and the above-right context (e.g., block 6), as the earlier blocks 2, 3 and 6 are generally considered available (e.g., completed processing) before the block 9 processing is initiated.

A macroblock may have sixteen 4×4 blocks (or sub-block), each with 9 prediction modes. Therefore, up to 144 (=16×9) 4×4 prediction modes may be performed for a single macroblock. If the 4×4 blocks are processed in the coding order 90 shown in FIG. 1, 56 (=8×6 left context+4×2 above-right context) out of the 144 prediction modes may have to wait for the previous block to be fully processed.

Figure 6:
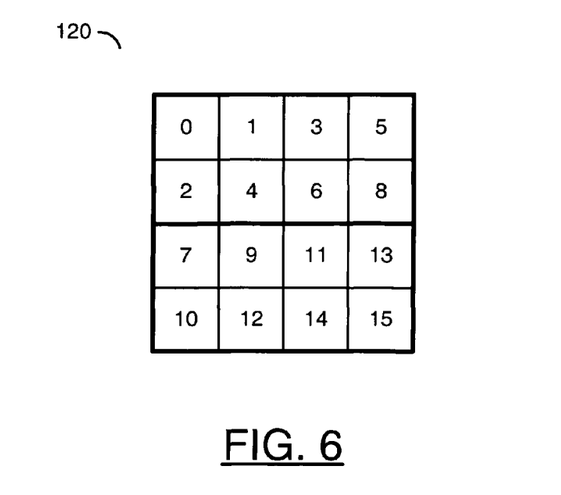
FIG. 6 is a block diagram of a 4×4 prediction order shown in accordance with a preferred embodiment of the present invention.

Referring to FIG. 6, a block diagram of a 4×4 prediction order 120 is shown in accordance with a preferred embodiment of the present invention. The prediction order 120 generally accounts for the dependencies for intra 4×4 prediction and motion vector prediction. Generally, the prediction order 120 differs from the coding order 90 in that (i) the positions 3 and 4 may be swapped, (ii) the positions 7 and 8 may be swapped and (iii) the positions 11 and 12 may be swapped. A transformation from the coding order 90 to the prediction order 120 may be implemented with a 4×4 block buffer to delay the earlier of the swapped blocks.

Figure 7:
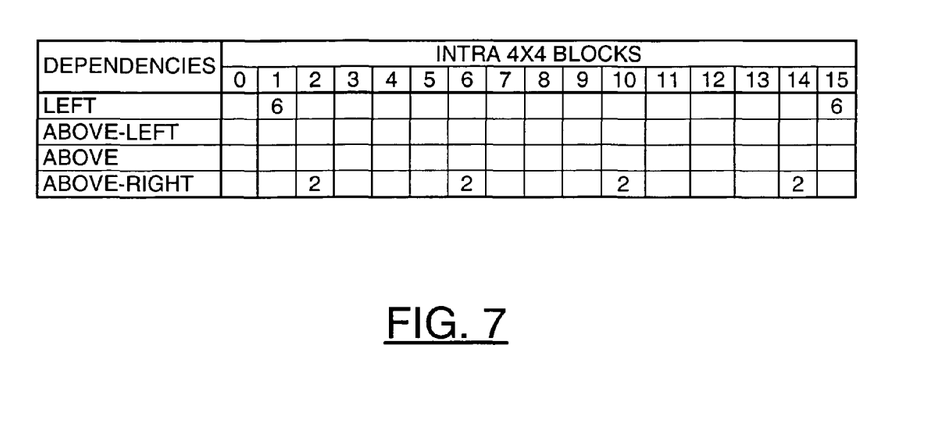
FIG. 7 is a table for intra 4×4 prediction dependencies using the processing order.

Referring to FIG. 7, a table for intra 4×4 prediction dependencies using the processing order 120 is shown. The dependencies for most of the odd-numbered blocks have been eliminated, except for the block numbers 1 and 15. Therefore, the number of block dependencies may be reduced from 56 to only 20 (=2×6 left context+4×2 above-right context) out of 144. The dependency reduction generally increases a codec throughput since more blocks may be processed in parallel.

Figure 8:
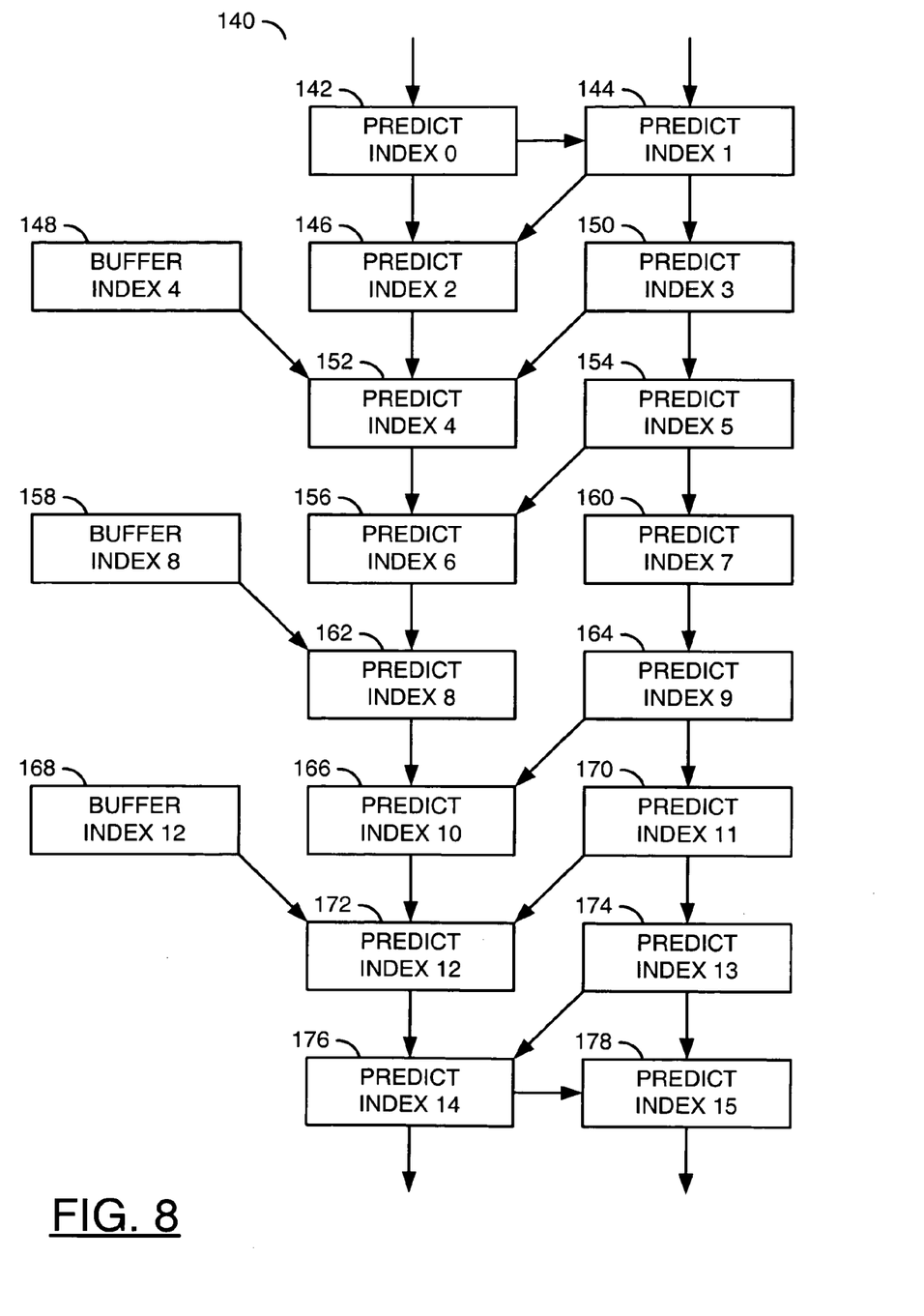
FIG. 8 is a flow diagram of an example parallel processing method using the prediction order.

Referring to FIG. 8, a flow diagram of an example parallel processing method 140 using the prediction order 120 is shown. The method (or process) 140 may be referred to as a parallel processing method. The parallel processing method 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162, a step (or block) 164, a step (or block) 166, a step (or block) 168, a step (or block) 170, a step (or block) 172, a step (or block) 174, a step (or block) 176 and a step (or block) 178. The parallel processing method 140 is generally illustrated as two parallel processes. Other numbers of parallel processes may be implemented to meet the criteria of a particular application.

In the step 142, a left parallel process may begin by intra predicting a block at index number (or position) 0. Since the left context block 106, the above-left context block 108, the above context block 102 and the above-right context block 104 may already be known, the intra prediction of the block 0 may have no dependencies for any of the 9 prediction modes. An intra prediction of the block at index umber 1 may begin in a right parallel process with the step 144 substantially simultaneously with the intra prediction of the block 0 in the step 142. However, the block 0 generally forms the left context for the block 1. Therefore, prediction modes 0, 3 and/or 7 may be performed first in the step 144 since the prediction modes 0, 3 and 7 do not depend on the left context. The remaining prediction modes 1, 2, 4, 5, 6 and 8 may be used in the step 144 after the block 0 context becomes settled (e.g., step 142 ends).

Figure 9A:
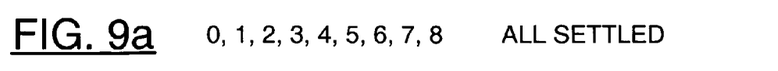
FIGS. 9a-9g are a set of prediction mode sequences.
Figure 9B:
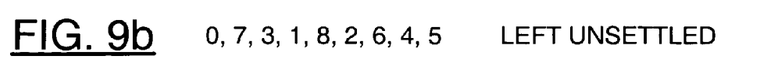

Referring to FIGS. 9a-9g, a set of prediction mode sequences is shown. For the step 142 where the appropriate surrounding context is known, a first prediction mode sequence may be used as shown in FIG. 9a. For the step 144 where the left context may be absent at the start of the intra prediction, a second prediction sequence may be used as shown in FIG. 9b. The second prediction sequence generally schedules the prediction modes that depend on the missing left context toward an end of the sequence.

Figure 9C:
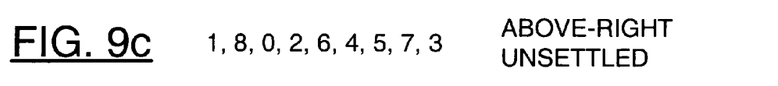
Figure 9D:
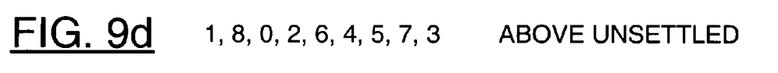

Referring again to FIG. 8, in the step 146, the block index number 2 may begin processing after completion of the block 0. Since the block 2 uses the block 1 as the above-right context, the intra prediction of the block 2 may (i) begin with the prediction modes 0, 1, 2, 4, 5, 6 and/or 8 and (ii) end with the prediction modes 3 and/or 7. For the step 146 where the above-right context may be absent at the start of the intra prediction, a third prediction sequence may be used, as shown in FIG. 9c. If the above context were absent at the start of the step 146 (e.g., block 2 is processed in parallel to block 0), a fourth sequence of the prediction modes may be used starting with the modes 1 and/or 8, as shown in FIG. 9d. Furthermore, if the blocks are received in the coding order 90, the block index number 4 (coding order block 3) may be temporarily buffered in the step 148.

The block index number 3 (coding order block 4) may begin processing in the step 150 after completion of the block 1. Block 3 generally uses the block 1 as the left context, the block 102 for the above context and the block 104 and the above-right context. As such, the intra prediction of the block 3 may have no processing dependencies. The block 0, the block 1 and the block 2 reside in an upper-left quadrant of the 16×16 block and thus may be considered as a first group of the sub-blocks. The block 3 resides in an upper-right quadrant of the 16×16 block and thus may be considered as a second group of the sub-blocks.

In the step 152, the previously buffered block 4 may begin intra prediction in the left process upon completion of the block 2. Since the block 4 uses the block 3 as the above-right context, the block 4 may begin the intra prediction using the third sequence shown in FIG. 9c. The block 5 may begin intra prediction in the right process in the step 154 upon completion of the processing for the block 3. Since the block 5 uses the block 3, the block 102 and the block 104 for context, no intra prediction dependencies may exist for the block 5.

Intra prediction for the block 6 may begin in step 156 upon completion of the intra prediction for the block 4. The block 6 generally uses the block 4, the block 1, the block 3 and the block 5 as the surrounding context. Since the prediction of the block 5 in step 154 may not be complete when the prediction of the block 6 begins in the step 156, the step 156 may use the third prediction mode sequence shown in FIG. 9c. If the blocks are received in the coding order 90, the block index number 8 (coding order block 7) may be temporarily buffered in the step 158. The block 4 may reside in the upper-left quadrant along with the block 0, the block 1 and the block 2. As such, the block 4 may be considered as part of a third group of the sub-blocks. The block 5 and the block 6 may reside in the upper-right quadrant along with the block 3 (and the block 8). Therefore, the block 5 and the block 6 may be considered as part of a fourth group of the sub-blocks.

The block index number 7 (coding order block 8) may begin processing in the step 160 after completion of the block 4. The block 7 generally uses the block 106, the block 108, the block 2 and the block 4 as the context. As such, the intra prediction of the block 7 may have no processing dependencies. The block 7 may reside in a lower-left quadrant of the 16×16 block and may be considered a fifth group of the sub-blocks.

The intra predictions for the block 8 through the block 13 and the buffering of the block 12 may follow in the steps 162-174, similar to the intra prediction for the block 4 through the block 7. In the step 176, an intra prediction for the block 14 may begin. Since the block 14 uses the block 13 as the above-right context, the prediction of block 14 may depend on the completion of the block 13 in the step 174. Therefore, the step 176 may use the third sequence of prediction modes shown in FIG. 9c. In the step 178, an intra prediction for the block 15 may begin. Since the block 15 uses the block 14 as the left context, the step 178 may use the second sequence of prediction modes as shown in FIG. 9b.

The H.264/AVC recommendation generally defines the same 9 prediction modes for intra 8×8 predictions as the intra 4×4 predictions shown in FIG. 2. Therefore, the same four prediction mode sequences may be used for the intra 8×8 predictions, similar to the four prediction modes sequences used for the intra 4×4 predictions. For example, when a left context is absent at the start of an intra 8×8 prediction, the second sequence shown in FIG. 9b may be applied. When an above-right context is absent at the start of an intra 8×8 prediction, the third sequence shown in FIG. 9c may be applied. The fourth prediction mode sequence shown in FIG. 9d may be used where the above context is not initially available.

Calculations for each of the predictions modes 0-8 generally create some intermediate results. Furthermore, some of the prediction modes may share the same intermediate results. A number of computations performed during the predictions may be reduced if the sequences are ordered to maximize a sharing of the intermediate results. Therefore, calculations of the prediction mode 8 may immediately follow the calculations of the prediction mode 1. The calculations of the predictions mode 3 may immediately follow the calculations the prediction mode 7. Furthermore, the prediction modes 2, 6, 4 and 5 may be calculated in order. As such, the third prediction mode sequence (FIG. 9c) and the fourth prediction mode sequence (FIG. 9d) may be the same sequence. Other prediction mode sequences may be implemented to meet the criteria of a particular application.

Figure 9E:
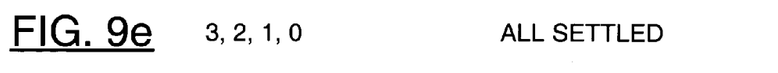
Figure 9F:
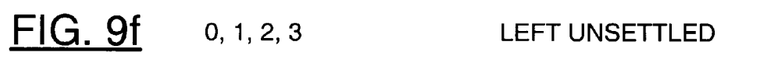
Figure 9G:
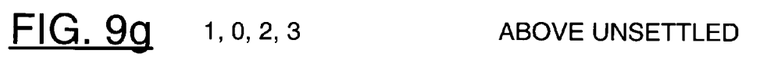

For intra 16×16 luminance (luma) predictions, only four prediction modes are defined by the H.264/AVC recommendation. If all of the appropriate context is available for an intra 16×16 prediction, a fifth sequence of prediction modes may be used, as shown in FIG. 9e. The vertical prediction mode 0 for the 16×16 blocks is generally independent of the left context. Therefore, an intra 16×16 prediction may be started using a sixth prediction sequence, as shown in FIG. 9f. The horizontal prediction mode 1 for the 16×16 blocks is generally independent of the above context. Therefore, an intra 16×16 prediction may be started using a seventh prediction sequence, as shown in FIG. 9g, where the above context is initially unsettled.

Intra 16×16 chrominance (chroma) predictions generally use the same four types of prediction modes (e.g., an intra chroma DC mode 0, an intra chroma horizontal mode 1, an intra chroma vertical mode 2 and an intra chroma plane mode 3) and the same three prediction sequences as the intra 16×16 luminance predictions. Both chroma blocks (e.g., a Cb block and a Cr block) of the current macroblock may use the same chrominance prediction mode. Once a particular chrominance prediction mode has been, determined, the particular chrominance prediction mode may be applied to each of the chroma blocks separately.

Similar dependencies may be present for inter-coded macroblocks/blocks/sub-blocks as predicted motion vectors are generally context dependent. A similar block reordering may be used for 4×4 sample partitions, 4×8 sample partitions, and 8×4 sample partitions to reduce the inter block dependencies.

Figure 10:
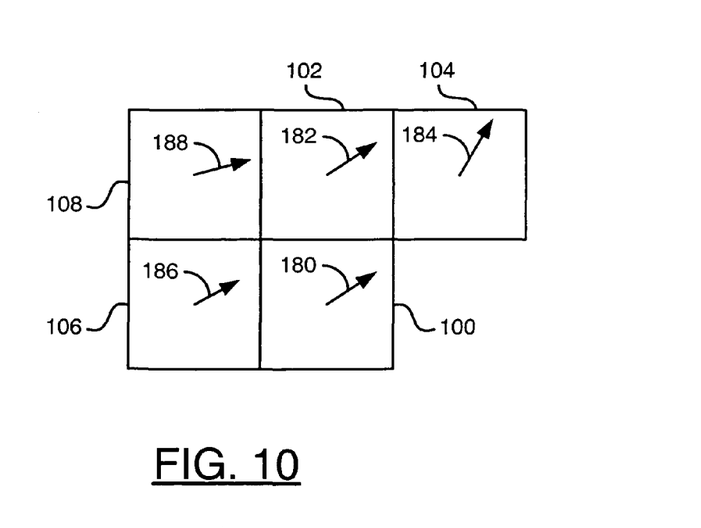
FIG. 10 is a block diagram of an example set of 4×4 blocks and associated motion vectors.

Referring to FIG. 10, a block diagram of an example set of 4×4 blocks and associated motion vectors is shown. A predicted motion vector 180 may be calculated for the current block 100 based on the motion vectors of the surrounding blocks. The blocks 102, 104, 106 and 108 may have respective motion vectors 182, 184, 186 and 188. The predicted motion vector 180 may be defined as a median of the motion vectors 182, 184 and 186. The motion vector 188 (if available) may be used in place of the motion vector 186 where the motion vector 186 is not available. The H.264/AVC recommendation generally describes predicted motion vectors in section 8.4.1 and the associated subsections, which are hereby incorporated by reference in its entirety. The median function is generally defined in equation 1 as follows:

$$\text{Median}(x,y,z) = x+y+z - \text{Min}(x,\text{Min}(y,z)) - \text{Max}(x,\text{Max}(y,z)) \qquad \text{Eq. 1}$$

The Min (minimum) function may be defined in equation 2 as follows:

$$\text{Min}(x,y) = x \text{ if } x \leq y \text{ and } y \text{ if } x > y \qquad \text{Eq. 2}$$

The Max (maximum) function may be defined in equation 3 as follows:

$$\text{Max}(x,y) = x \text{ if } x \geq y \text{ and } y \text{ if } x < y \qquad \text{Eq. 3}$$

Therefore, calculation of the prediction motion vector 180 depends on knowing the surrounding motion vectors 182, 184 and 186 (or 188).

Referring again to FIG. 8, processing of the blocks 0-15 to calculate the predicted motion vectors may be performed in parallel. Starting at the step 142, the predicted motion vector (PMV) for the block 0 may be calculated (predicted). Since the surrounding context motion vectors from the left block 106, the above block 102 and the above-right block 104 may be already known, the prediction of the PMV 0 for block 0 may have no dependencies. In the step 144, the PMV 1 for the block 1 may be predicted substantially simultaneously with the prediction of the PMV 0. However, the PMV 1 may consider the block 0 as the left context. Therefore, the prediction of the PMV 1 may not be completed until the PMV 0 is settled.

Calculations for the PMV 2 of the block 2 may start upon completion of the step 142 for the block 0. Since the PMV 2 may be calculated from the PMV 1, the step 146 may not complete until after the step 144 has completed. In the step 150, the PMV 3 of block 3 may begin prediction. Calculation of PMV 3 depends on the context in the left block 1, the above block 102 and the above-right block 104 so the PMV 3 may be predicted without any dependencies on completion of the previous block (e.g., block 2).

In the step 152, prediction of the PMV 4 for the block 4 may begin. The PMV 4 generally depends on the PMV 1, the PMV 2 and the PMV 3. As such, the step 152 may not be completed until the PMV 3 is known in the step 150. In the step 154, prediction of the PMV 5 for the block 5 may begin. The PMV 5 may have no dependency on the PMV 4 and thus the prediction may be processed without any dependencies on the other steps.

Calculations for the PMV 6 in the step 156 may begin upon the completion of the PMV 4. Likewise, calculations for the PMV 7 for the block 7 may begin in the step 158 upon completion of the PMV 5 prediction in the step 154. The prediction of the PMV 6 may depend on the completion of the PMV 5 prediction. The prediction of the PMV 7 may be processed independently of the PMV 6 under the prediction order 120. In the steps 162-174, the PMV 8 through the PMV 13 may be generated similar to the PMV 4 through the PMV 7. The PMV 14 may be calculated in the step 176 with a dependency on the completion of the PMV 13. The PMV 15 may be calculated in the step 178 with a dependency on the completion of the PMV 14.

The reordering of the prediction order 120 generally helps the processing throughput for both encoders and decoders. An advantage of the present invention may be more significant in the encoders that in the decoders. For example, when several 4×4 prediction modes are tried for each block position, an encoder may process the several prediction modes faster when fewer dependencies exist between the start of one prediction and the ending of another prediction. For the decoders, an advantage of the prediction order 120 generally works statistically. Depending on which mode is coded, the decoder may wait or not for the previous block to be fully processed. The higher the resolution of the fields/frames and/or the lower the clock frequency of the processing circuitry, the more significant the advantages of the prediction order 120 may become.

Figure 11:
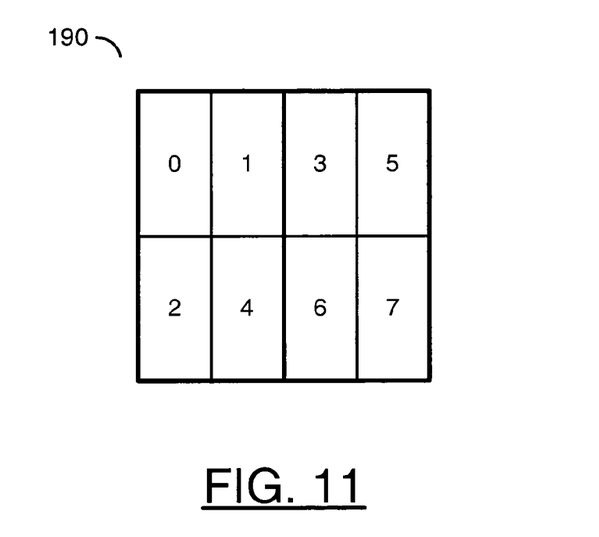
FIG. 11 is a block diagram of a 4×8 prediction order.

Referring to FIG. 11, a block diagram of a 4×8 prediction order 190 is shown. The prediction order 190 generally accounts for the dependencies for motion vector predictions for 4×8 blocks. The prediction order 190 may rearrange the 4×8 blocks within and between the upper-right quadrant and the lower-left quadrant. As such, the eight sub-blocks in the prediction order 190 may have basically the same order as the eight sub-blocks in the top half of the prediction order 120 (FIG. 6).

Figure 12:
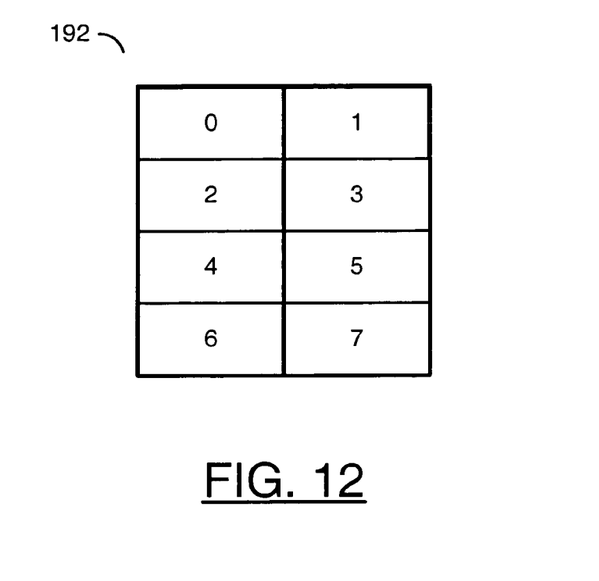
FIG. 12 is a block diagram of an 8×4 prediction order.

Referring to FIG. 12, a block diagram of an 8×4 prediction order 192 is shown. The prediction order 192 generally accounts for the dependencies for motion vector predictions of 8×4 blocks. The prediction order 192 may arrange the even-numbered blocks in a left half of the block and the odd-numbered blocks in a right half of the 16×16 block.

Figure 13:
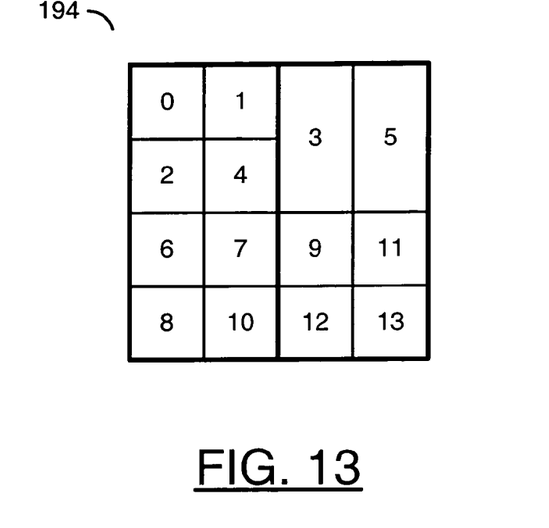
FIG. 13 is a block diagram of an example prediction order.

Referring to FIG. 13, a block diagram of an example prediction order 194 is shown. The prediction order 194 generally accounts for the dependencies where three of the four 8×8 blocks are divided into 4×4 blocks and a single 8×8 block is further divided into 4×8 blocks.

Figure 14:
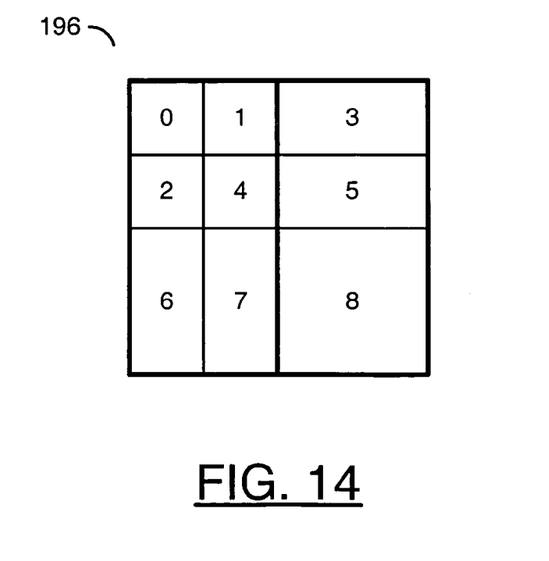
FIG. 14 is a block diagram of another example prediction order.

Referring to FIG. 14, a block diagram of another example prediction order 196 is shown. The prediction order 196 generally accounts for the dependencies where a single 8×8 block is divided into 4×4 blocks, a single 8×8 block is further divided into 4×8 blocks, a single 8×8 block is further divided into 8×4 blocks and a single 8×8 block is not sub-divided. Other prediction orders may be implemented to meet the criteria of a particular application.

A number of the intra prediction modes may be reduced based on statistics calculated for the macroblocks. For example, edge information may be used as statistics to determine areas in the original picture for special coding. The edge information may be used to improve intra and inter mode selection during encoding. In some embodiments, an edge direction of a macroblock may be taken as the sole intra prediction direction.

The functions performed by the diagrams of FIGS. 6, 8 and 11-13 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for processing intra prediction of a plurality of sub-blocks in a block of video according to a plurality of prediction modes, said method comprising the steps of:
   (A) intra predicting a first group of said sub-blocks in a first quadrant of said block, each sub-block using a corresponding sequence of prediction modes;
   (B) intra predicting a second group of said sub-blocks in a second quadrant of said block after starting said intra predicting of said first group, each sub-block using a corresponding sequence of prediction modes;
   (C) intra predicting a third group of said sub-blocks in said first quadrant after starting said intra predicting of said second group, each sub-block using a corresponding sequence of prediction modes, wherein said first group and said third group together account for all of said sub-blocks in said first quadrant;
   wherein said plurality of sub-blocks in said block is processed in at least two parallel processes, and every two successively-indexed sub-blocks in said block are processed in two distinct processes in the at least two parallel processes, and wherein the sequence of prediction modes corresponding to each sub-blocks is scheduled in order of availability of context needed for the plurality prediction mode.

2. The method according to claim 1, further comprising the steps of:
   intra predicting a fourth group of said sub-blocks in said second quadrant after starting said intra predicting of said third group, each sub-block using a corresponding sequence of prediction modes;
   intra predicting a fifth group of said sub-blocks in a third quadrant of said block after starting said intra predicting of said fourth group, each sub-block using a corresponding sequence of prediction modes; and
   intra predicting a sixth group of sub-blocks in said second quadrant after starting said intra predicting of said fifth group, each sub-block using a corresponding sequence of prediction modes, wherein said second group, said fourth group and said sixth group together account for all of said sub-blocks in said second quadrant.

3. The method according to claim 1, wherein a coding order of said sub-blocks comprises an index number 0, an index number 1, an index number 2, an index number 3, an index number 4, an index number 5, an index number 6, and index number 7, an index number 8, an index number 9, an index number 10, an index number 11, an index number 12, an index number 13, an index number 14 and an index number 15 sequentially from first to last.

4. The method according to claim 3, wherein (i) said first quadrant comprises an upper-left quadrant of said block and (ii) a prediction order in said upper-left quadrant comprises said index number 0, said index number 1, said index number 2 and said index number 4 for an upper-left corner, an upper-right corner, a lower-left corner and a lower-right corner of said upper-left quadrant respectively.

5. The method according to claim 3, wherein (i) said second quadrant comprises an upper-right quadrant of said block and (ii) said prediction order in said upper-right quadrant comprises said index number 3, said index number 5, said index number 6 and said index number 8 for an upper-left corner, an upper-right corner, a lower-left corner and a lower-right corner of said upper-right quadrant respectively.

6. The method according to claim 1, wherein a prediction order results in
   (i) at most two of said sub-blocks being dependent on an availability of a left context and
   (ii) at most four of said sub-blocks being dependent on an availability of an above-right context.

7. The method according to claim 1, wherein an encoding of said video is compliant with an International Telecommunication Union-Telecommunications Standardization Sector Recommendation H.264 accounting for said intra prediction of said sub-blocks in said step (A), said step (B) and said step (C).

8. The method according to claim 1, further comprising: before intra-predicting the sub-blocks, determining an order of applying the intra-predicting on the indexed sub-blocks as dynamic ordering, the dynamic ordering of the indexed sub-blocks provided to minimize a number of dependencies of the indexed sub-blocks on image data values of adjacent sub-blocks.

9. The method according to claim 8, further comprising buffering data of one or more indexed sub-blocks in order to dynamically change the ordering for intra-predicting the sub-blocks, the dependencies of the sub-blocks having variation based on a mode of intra sub-block prediction.

10. The method according to claim 9, wherein the buffering buffers only data for only a single indexed sub-block at one time.

11. The method of claim 1, wherein for every two successively-indexed sub-blocks, a first of the two sub-blocks is prediction processed in a first of the parallel processes for intra prediction, while a second of the two sub-blocks is prediction processed in a second of the two parallel processes for intra prediction.

12. The method of claim 1, further comprising: before intra-predicting the sub-blocks, determining which of a plurality of prediction modes to eliminate from the intra-predicting processes based on statistics calculated for the block.

13. A method for processing intra prediction of a plurality of sub-blocks in a block of video according to a plurality of prediction modes, comprising the steps of:
   (A) predicting a group of plurality of motion vectors corresponding to said sub-blocks in a first half of said block, each sub-block using a corresponding sequence of prediction modes;
   (B) predicting a first one of said motion vectors corresponding to said sub-blocks in a second half of said block after starting said predicting of said group, each sub-block using a corresponding sequence of prediction modes;
   (C) predicting a second one of said motion vectors corresponding to said sub-blocks in said first half after starting said predicting of said first one to said motion vector, each sub-block using a corresponding sequence of prediction modes; and
   wherein said plurality of sub-blocks in said block is processed in at least two parallel processes, and every two successively-indexed sub-blocks in said block are processed in two distinct processes in the at least two parallel processes, wherein the sequence of prediction modes corresponding to each sub-block is scheduled in order of availability of context needed for the plurality of prediction modes.

14. The method according to claim 13, further comprising the step of:

predicting a third one of said motion vectors corresponding to said sub-blocks in said second half after starting said predicting of said second one of said motion vectors.

15. The method according to claim 13, wherein a coding order of said sub-blocks comprises an index number 0, an index number 1, an index number 2, an index number 3, an index number 4, an index number 5, an index number 6 and an index number 7 sequentially from first to last.

16. The method according to claim 15, wherein (i) said first half comprises a left half of said block and (ii) a prediction order in an upper quadrant of said left half comprises said index number 0, said index number 1, said index number 2, and said index number 4 for an upper-left corner, an upper-right corner, a lower-left corner and a lower-right corner respectively.

17. The method according to claim 15, wherein (i) said first half comprises a left half of said block and (ii) a prediction order in said left half comprises said index number 0, said index number 1, said index number 2 and said index number 4 for an upper-left corner, an upper-right corner, a lower-left corner and a lower-right corner respectively.

18. The method according to claim 15, wherein (i) said first half comprises a left half of said block and (ii) a prediction order in said left half comprises said index number 0, said index number 2, said index number 4 and said index number 6 from top to bottom respectively.

19. The method according to claim 13, wherein an encoding of said video is compliant with an International Telecommunication Union-Telecommunications Standardization Sector Recommendation H.264 accounting for said predicting of said motion vectors in said step (A), said step (B) and said step (C).

* * * * *